United States Patent
Hsu et al.

(10) Patent No.: US 12,431,791 B2
(45) Date of Patent: Sep. 30, 2025

(54) HIGH EFFICIENCY BOOST POWER FACTOR CORRECTION CIRCUIT HAVING SHARED PIN AND CONVERSION CONTROL CIRCUIT THEREOF

(71) Applicant: Richtek Technology Corporation, Zhubei (TW)

(72) Inventors: Shih-Ho Hsu, New Taipei (TW); Kun-Yu Lin, Hsinchu (TW); Wei-Hsu Chang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 269 days.

(21) Appl. No.: 18/349,160

(22) Filed: Jul. 9, 2023

(65) Prior Publication Data

US 2024/0048046 A1    Feb. 8, 2024

(30) Foreign Application Priority Data

Aug. 4, 2022   (TW) .................................. 111129421

(51) Int. Cl.
*H02M 1/42*    (2007.01)
*H02M 1/32*    (2007.01)
*H02M 3/156*   (2006.01)

(52) U.S. Cl.
CPC ......... *H02M 1/4225* (2013.01); *H02M 1/327* (2021.05); *H02M 3/156* (2013.01)

(58) Field of Classification Search
CPC ...... H02M 1/4225; H02M 1/42; H02M 3/158; H02M 3/156; H02M 1/327
See application file for complete search history.

(56) References Cited

U.S. PATENT DOCUMENTS

| | | | |
|---|---|---|---|
| 2013/0083562 A1* | 4/2013 | Wu .................... | H02M 1/32 363/16 |
| 2014/0016378 A1* | 1/2014 | Ke .................... | H02M 3/33507 363/21.18 |
| 2015/0295496 A1* | 10/2015 | Chen .................. | H02M 3/33523 363/21.18 |
| 2016/0190936 A1* | 6/2016 | Ke .................... | H02M 3/33507 363/21.12 |
| 2019/0013740 A1* | 1/2019 | Lin .................... | H02M 1/32 |
| 2019/0103807 A1* | 4/2019 | Chen .................. | H02H 7/125 |
| 2021/0376714 A1* | 12/2021 | Tsou .................. | G01R 19/175 |

* cited by examiner

*Primary Examiner* — Alex Torres-Rivera
(74) *Attorney, Agent, or Firm* — Tung & Associates

(57) ABSTRACT

A boost power factor correction circuit includes: a switch and an inductor coupled to each other; a current sensing device generating a current sensing signal according to a current flowing through the switch; a temperature sensing device coupled to the inductor to generate a temperature sensing signal; and a conversion control circuit operating the switch. The conversion control circuit is an integrated circuit and includes: a shared pin coupled to the temperature sensing device and the current sensing device; and a current sensing circuit and a temperature sensing circuit which sense a multipurpose sensing signal through the shared pin. The multipurpose sensing signal is related to the current sensing signal when the switch is ON and related to the temperature sensing signal when the switch is OFF. The temperature sensing signal is related to an input voltage, an output voltage and an electrical parameter of the temperature sensing device.

28 Claims, 9 Drawing Sheets

HIGH EFFICIENCY BOOST POWER FACTOR CORRECTION CIRCUIT HAVING SHARED PIN AND CONVERSION CONTROL CIRCUIT THEREOF

CROSS REFERENCE

The present invention claims priority to TW 111129421 filed on Aug. 4, 2022.

BACKGROUND OF THE INVENTION

Field of Invention

The present invention relates to a boost power factor correction circuit; particularly, it relates to a high efficiency boost power factor correction circuit having a shared pin. The present invention also relates to a conversion control circuit for use in such high efficiency boost power factor correction circuit.

Description of Related Art

Please refer to FIG. 1, which shows a schematic diagram of a conventional boost power factor correction circuit. As shown in FIG. 1, the conventional boost power factor correction circuit 1000 comprises: a boost power stage circuit 101, a control circuit 102 and a thermistor RT1. The conventional boost power factor correction circuit 1000 converts an input voltage VI to an output voltage VO with corrected power factor. The boost power stage circuit 101 includes: an inductor L, a switch SW11 and a switch SW12. The control circuit 102 is an integrated circuit, which receives a feedback voltage VF via a pin FB, and receives a current sensing signal VC1 generated by a current sensing resistor RC1 via a pin CS. According to the feedback voltage VF and the current sensing signal VC1, the control circuit 102 controls the switch SW11 and the switch SW12 via a pin GA so that these switches operate according to a duty ratio. The control circuit 102 is connected to ground potential via a pin GD. In order to prevent the conventional boost power factor correction circuit 1000 from being damaged due to undesirably high temperature, the control circuit 102 is coupled to the thermistor RT1 via a pin TS, to receive a temperature sensing signal VT1 generated by the thermistor RT1, for over temperature protection (OTP).

The prior art shown in FIG. 1 has the following drawback that: for over temperature protection (OTP) of the boost power factor correction circuit 1000, the control circuit 102 requires a dedicated pin for sensing temperature, which increases the size and cost the integrated circuit.

In view of the above, to overcome the drawback in the prior art, the present invention proposes a high efficiency boost power factor correction circuit having a shared pin. Advantages of the present invention include: that the present invention can execute over temperature protection (OTP) for the boost power factor correction circuit by lower chip size and lower manufacturing cost of the integrated circuit, and that the present invention can enhance efficiency of the boost power factor correction circuit.

SUMMARY OF THE INVENTION

From one perspective, the present invention provides a boost power factor correction circuit, which is configured to operably convert an input voltage to an output voltage with corrected power factor; the boost power factor correction circuit comprising: a boost power stage circuit including a first switch and a first inductor which are coupled to each other; a current sensing device coupled to the first switch, wherein the current sensing device is configured to operably generate a current sensing signal according to a current flowing through the first switch; a temperature sensing device coupled to the first inductor in non-contact fashion, wherein the temperature sensing device is configured to operably generate a temperature sensing signal; and a conversion control circuit, which is configured to operate the first switch, so as to control the first inductor to switch between the output voltage and a ground potential according to a duty ratio, thereby converting the input voltage to the output voltage, wherein the conversion control circuit is an integrated circuit; the conversion control circuit including: a shared pin coupled to the temperature sensing device and the current sensing device; a current sensing circuit, which is configured to operably sense a multipurpose sensing signal via the shared pin when the first switch is ON, wherein in a period when the first switch is ON, the multipurpose sensing signal is related to the current sensing signal, wherein the conversion control circuit is configured to operably control the duty ratio according to the current sensing signal; and a temperature sensing circuit, which is configured to operably sense the multipurpose sensing signal via the shared pin when the first switch is OFF, wherein in a period when the first switch is OFF, the multipurpose sensing signal which is responds to the temperature sensing signal, wherein when the temperature sensing signal exceeds a temperature sensing threshold, it indicates that a temperature to be sensed is higher than a predetermined temperature threshold; wherein the temperature sensing signal is related to the input voltage, the output voltage and an electrical parameter of the temperature sensing device which changes as the temperature to be sensed changes.

In one embodiment, the boost power factor correction circuit further comprises: a second inductor coupled to the first inductor in an electromagnetic induction fashion, wherein a first end of the second inductor is coupled to the temperature sensing device, wherein the temperature sensing signal is related to a difference between the input voltage and the output voltage.

In one embodiment, the second inductor and the first inductor constitute a transformer, wherein the first inductor corresponds to a first winding of the transformer, whereas, the second inductor corresponds to a second winding of the transformer.

In one embodiment, the temperature sensing circuit is configured to operably sense the temperature sensing signal via the shared pin during a demagnetization period of the second inductor.

In one embodiment, the boost power factor correction circuit further comprises: a unidirectional conduction device coupled between the second inductor and the temperature sensing device, so that a voltage at the shared pin is not smaller than zero.

In one embodiment, the boost power factor correction circuit further comprises: a voltage divider resistor coupled to the unidirectional conduction device; and a filter resistor coupled between the current sensing signal and the multipurpose sensing signal, wherein the filter resistor is configured to operably filter the current sensing signal to generate the multipurpose sensing signal; wherein the second inductor generates an auxiliary voltage in an electromagnetic induction fashion, wherein when the first switch is OFF, the voltage divider resistor, the temperature sensing device, the filter resistor and the current sensing device are configured to operably divide the auxiliary voltage to generate the multipurpose sensing signal, wherein the multipurpose sensing signal is related to the temperature sensing signal.

In one embodiment, the temperature sensing device is a thermistor having a positive temperature coefficient or a negative temperature coefficient, wherein the temperature sensing signal is proportional to a difference between the input voltage and the output voltage, and wherein the temperature sensing signal is inversely proportional to a resistance of the thermistor.

In one embodiment, the current sensing device is a current sensing resistor, which is connected in series to the first switch, wherein the temperature sensing signal is further proportional to a turn ratio of the second inductor to the first inductor, and wherein the temperature sensing signal is further proportional to a divided voltage of the difference between the input voltage and the output voltage, wherein the divided voltage is related to the resistance of the thermistor and a resistance of the current sensing resistor.

In one embodiment, the conversion control circuit further includes: a pulse width control circuit, which is configured to operably generate a pulse width modulation (PWM) signal and decide the duty ratio according to the output voltage and a current related signal which is related to the current sensing signal, wherein the PWM signal is configured to operably control the first switch to switch according to the duty ratio, wherein the pulse width control circuit is further configured to operably generate an enable signal which is related to the PWM signal; wherein the temperature sensing circuit includes: a comparison circuit coupled to the shared pin, wherein the comparison circuit is configured to operably compare the temperature sensing signal with the temperature sensing threshold when the enable signal indicates the first switch is OFF, so as to determine whether the temperature to be sensed is higher than the predetermined temperature threshold.

In one embodiment, the conversion control circuit further includes: a debouncing circuit or a counter, which is configured to operably reduce a noise of the temperature sensing signal.

In one embodiment, the boost power factor correction circuit further comprises a zero current detection resistor, wherein the conversion control circuit further includes: a zero current detection pin, wherein the zero current detection resistor is coupled between the zero current detection pin and the first end of the second inductor, wherein the first end of the second inductor is coupled to the temperature sensing device; and a clamping and detection circuit, which is configured to operably clamp a zero current detection voltage at the zero current detection pin via the zero current detection pin, so that the zero current detection voltage at the zero current detection pin is not lower than a predetermined negative voltage, and the clamping and detection circuit is configured to operably detect the zero current detection voltage, to determine a zero current time point at which a current flowing through the first inductor reaches zero.

In one embodiment, the conversion control circuit controls the boost power stage circuit to operate in a boundary conduction mode (BCM) or in a discontinuous conduction mode (DCM) further according to the zero current time point.

In one embodiment, the first end of the second inductor is coupled to the zero current detection pin via the zero current detection resistor, so that the zero current detection pin generates the zero current detection voltage.

In one embodiment, the clamping and detection circuit generates the temperature sensing threshold further according to the zero current detection voltage.

From another perspective, the present invention provides a conversion control circuit for use in a boost power factor correction circuit, wherein the boost power factor correction circuit is configured to operably convert an input voltage to an output voltage with corrected power factor, and wherein the boost power factor correction circuit includes: a boost power stage circuit including a first switch and a first inductor which are coupled to each other; a current sensing device coupled to the first switch, wherein the current sensing device is configured to operably generate a current sensing signal according to a current flowing through the first switch; and a temperature sensing device coupled to the first inductor in non-contact fashion, wherein the temperature sensing device is configured to operably generate a temperature sensing signal; wherein the conversion control circuit is configured to operate the first switch, so as to control the first inductor to switch between the output voltage and a ground potential according to a duty ratio, thus convert the input voltage to the output voltage, wherein the conversion control circuit is an integrated circuit; the conversion control circuit comprising: a shared pin coupled to the temperature sensing device and the current sensing device; a current sensing circuit, which is configured to operably sense a multipurpose sensing signal via the shared pin when the first switch is ON, wherein in a period when the first switch is ON, the multipurpose sensing signal is related to the current sensing signal, wherein the conversion control circuit is configured to operably control the duty ratio according to the current sensing signal; and a temperature sensing circuit, which is configured to operably sense the multipurpose sensing signal via the shared pin when the first switch is OFF, wherein in a period when the first switch is OFF, the multipurpose sensing signal which is responds to the temperature sensing signal, wherein when the temperature sensing signal exceeds a temperature sensing threshold, it indicates that a temperature to be sensed is higher than a predetermined temperature threshold; wherein the temperature sensing signal is related to the input voltage, the output voltage and an electrical parameter of the temperature sensing device which changes as the temperature to be sensed changes.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 1:
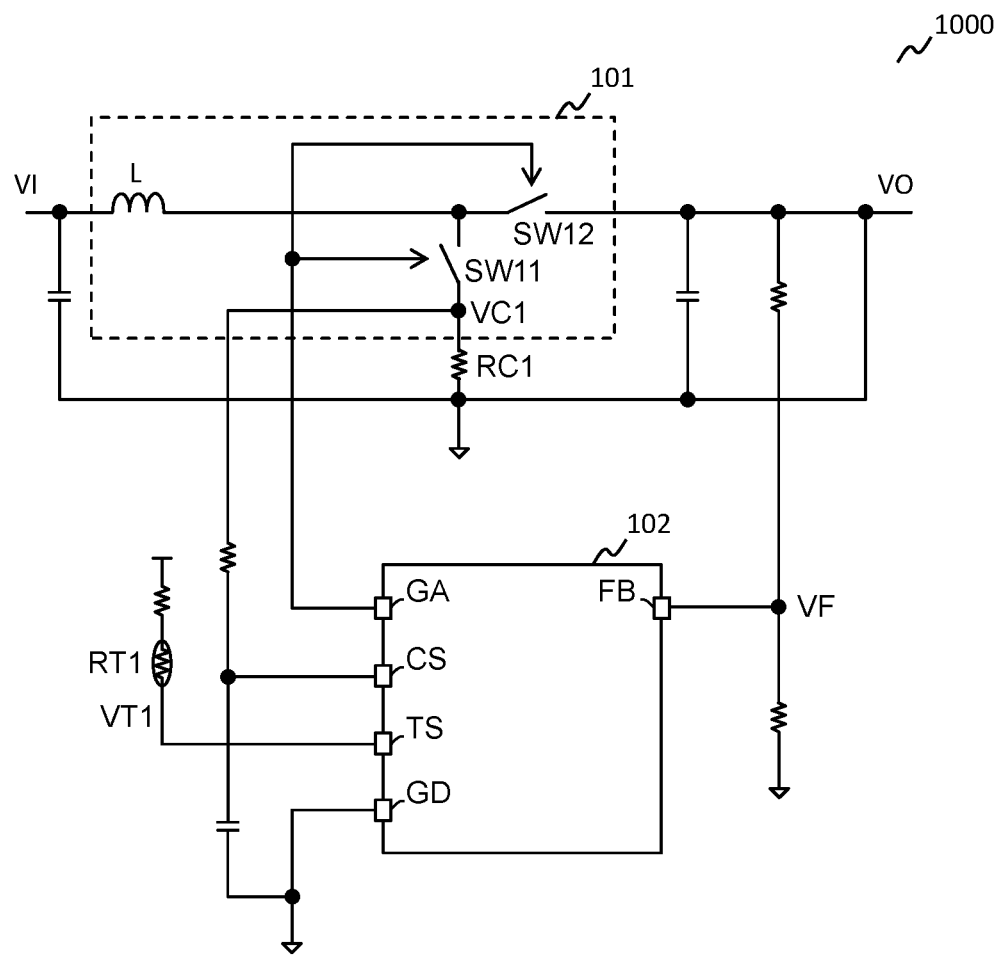
FIG. 1 shows a schematic diagram of a conventional boost power factor correction circuit.
Figure 2:
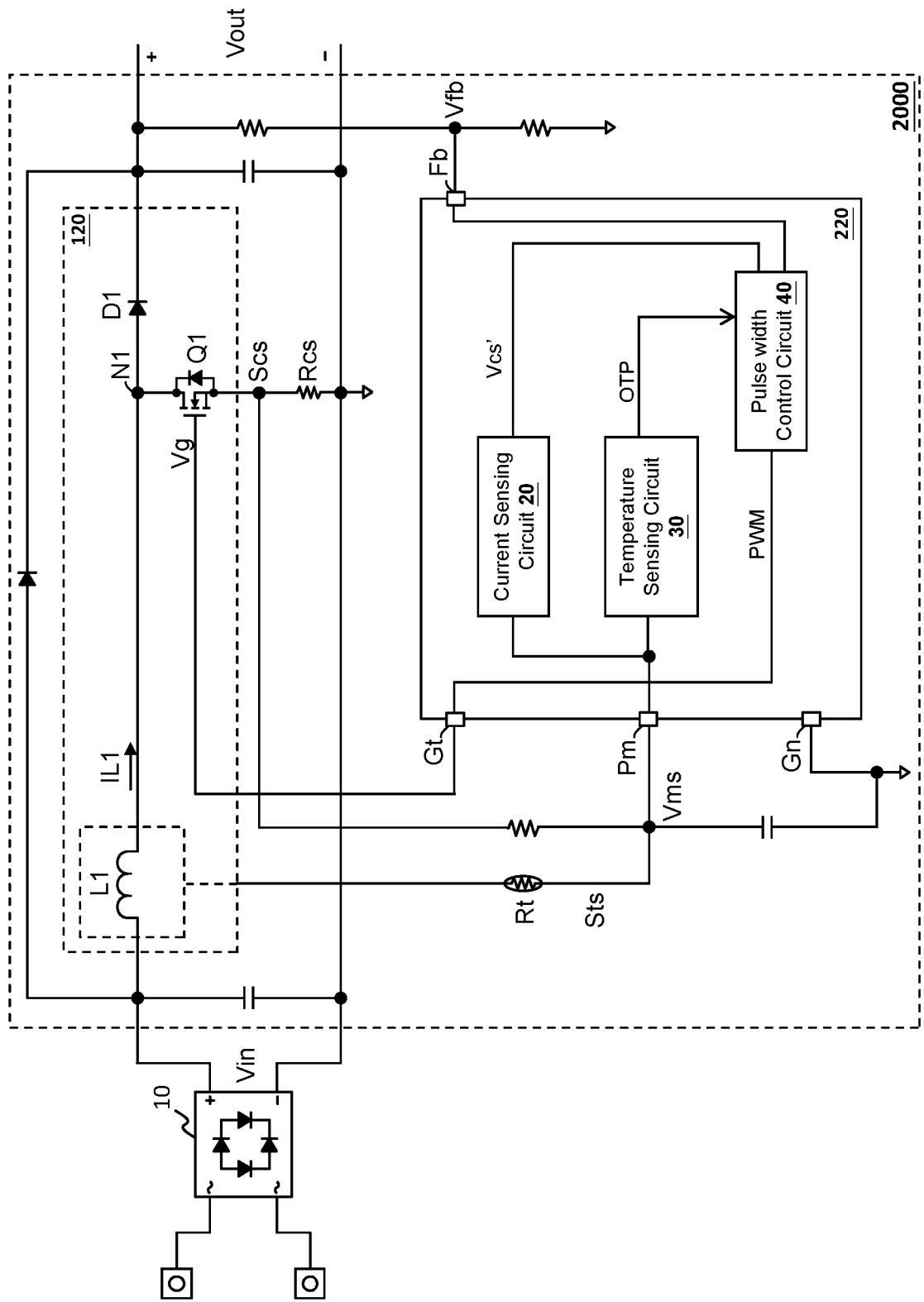
FIG. 2 shows a schematic diagram of a boost power factor correction circuit according to an embodiment of the present invention.

Please refer to FIG. 2, which shows a schematic diagram of a boost power factor correction circuit according to an embodiment of the present invention. In one embodiment, a rectifier 10 rectifies an alternating current (AC) voltage, to generate an input voltage Vin. The boost power factor correction circuit 2000 is configured to operably convert the input voltage Vin to an output voltage Vout with corrected power factor. In one embodiment, the boost power factor correction circuit 2000 comprises: a boost power stage circuit 120, a current sensing device Rcs, a temperature sensing device Rt and a conversion control circuit 220. In one embodiment, the boost power stage circuit 120 includes: a first switch, a second switch and a first inductor L1. In one embodiment, the first switch corresponds to a lower gate switch, whereas, the second switch corresponds to an upper gate switch, wherein the first switch can be a Metal-Oxide-Semiconductor (MOS) transistor, whereas, the second switch can be a switch or a diode. In this embodiment, the first switch is a transistor Q1 (e.g., NMOS transistor), whereas, the second switch is a diode D1. In one embodiment, a first end of the first inductor L1, a first end of the transistor Q1 and a first end of the diode D1 are commonly coupled to a node N1, so as to boost the input voltage Vin to the output voltage Vout. In one embodiment, the current sensing device Rcs is a current sensing resistor, which is connected in series between the transistor Q1 and a ground potential.

In one embodiment, as shown in FIG. 2, the current sensing device Rcs is coupled to the transistor Q1 and the current sensing device Rcs is configured to operably generate a current sensing signal Scs according to a current flowing through the transistor Q1. The temperature sensing device Rt is coupled to the first inductor L1 in non-contact fashion, to generate a temperature sensing signal Sts, wherein at least one electrical parameter of the temperature sensing device Rt, such as the resistance thereof, is correlated with ambient temperature; the electrical parameter can have a positive temperature coefficient or a negative temperature coefficient. In one embodiment, the conversion control circuit 220 is configured to operate the transistor Q1, so as to control the first inductor L1 to switch between the output voltage Vout and the ground potential according to a duty ratio, thus converting the input voltage Vin to the output voltage Vout. In one embodiment, the conversion control circuit 220 is an integrated circuit (IC) which includes: a shared pin Pm, a pin Gt, a pin Gn, a pin Fb, a current sensing circuit 20, a temperature sensing circuit 30 and a pulse width control circuit 40. In one embodiment, the shared pin Pm is coupled to the temperature sensing device Rt and the current sensing device Rcs. The pin Gt is coupled to a gate voltage Vg of the transistor Q1. The pin Gn is coupled to the ground potential. The pin Fb is coupled to a feedback signal Vfb.

Figure 3:
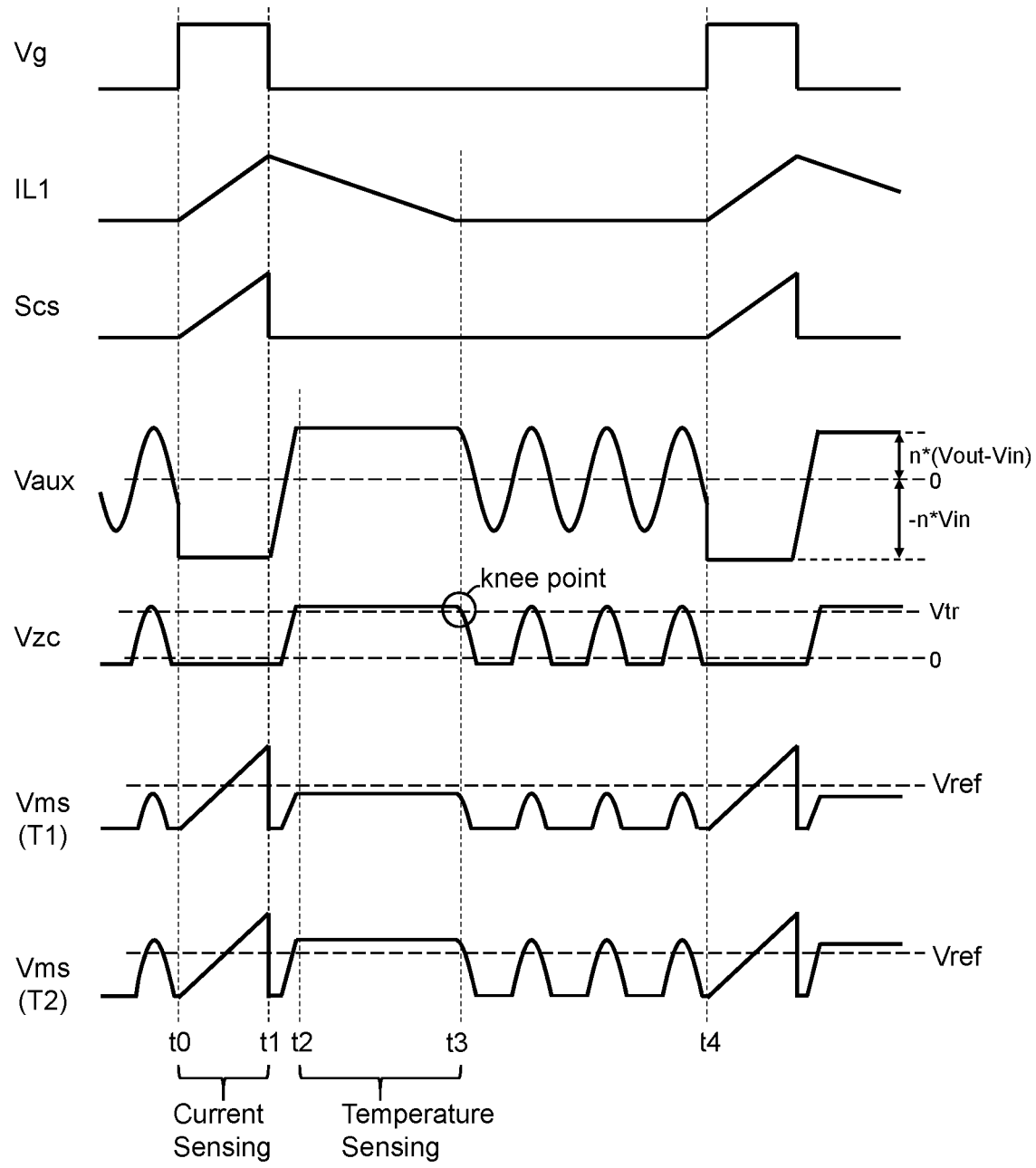
FIG. 3 illustrates a signal waveform diagram depicting the operation of a boost power factor correction circuit of FIG. 2 according to an embodiment of the present invention.

Please refer to FIG. 2 and FIG. 3. FIG. 3 illustrates a signal waveform diagram depicting the operation of a boost power factor correction circuit of FIG. 2 according to an embodiment of the present invention. In one embodiment, during the period ranging from the time point t0 to the time point t1 in FIG. 3, the gate voltage Vg turns ON the transistor Q1, whereby a current IL1 flowing through the first inductor L1 increases as time goes by. The current sensing circuit 20 senses a multipurpose sensing signal Vms via the shared pin Pm, to generate a current related signal Vcs'. In this case (i.e., during the period ranging from the time point t0 to the time point t1), the multipurpose sensing signal Vms is related to the current sensing signal Scs. During the period ranging from the time point t2 to the time point t3 in FIG. 3, the gate voltage Vg turns OFF the transistor Q1, whereby the current IL1 flowing through the first inductor L1 decreases as time goes by. The temperature sensing circuit 30 senses the multipurpose sensing signal Vms via the shared pin Pm. In this case (i.e., during the period ranging from the time point t2 to the time point t3), the multipurpose sensing signal Vms corresponds to the temperature sensing signal Sts. The temperature sensing signal Sts is related to a temperature to be sensed. When the temperature sensing signal Sts exceeds a temperature sensing threshold Vref, the temperature sensing circuit 30 generates a signal indicating that the temperature to be sensed is higher than a predetermined temperature threshold Tth1, which will be described in more detail later. In one embodiment, the temperature sensing signal Sts is related to the input voltage Vin, the output voltage Vout, and at least one electrical parameter of the temperature sensing device Rt which changes as the temperature to be sensed changes. In one embodiment, the pulse width control circuit 40 is configured to operably generate a pulse width modulation signal PWM and decide the duty ratio of the pulse width modulation signal PWM according to the feedback signal Vfb and a current related signal Vcs' which is correlated with the current sensing signal Scs, wherein the pulse width modulation signal PWM is configured to operably control the transistor Q1 to switch according to the duty ratio.

Figure 4A:
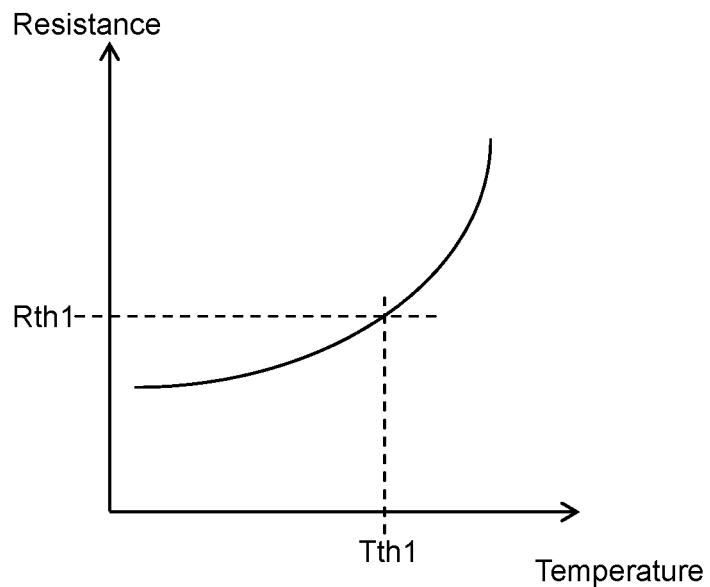
FIG. 4A illustrates resistance versus temperature relationship diagram of a temperature sensing device including a positive temperature coefficient thermistor according to an embodiment of the present invention.
Figure 4B:
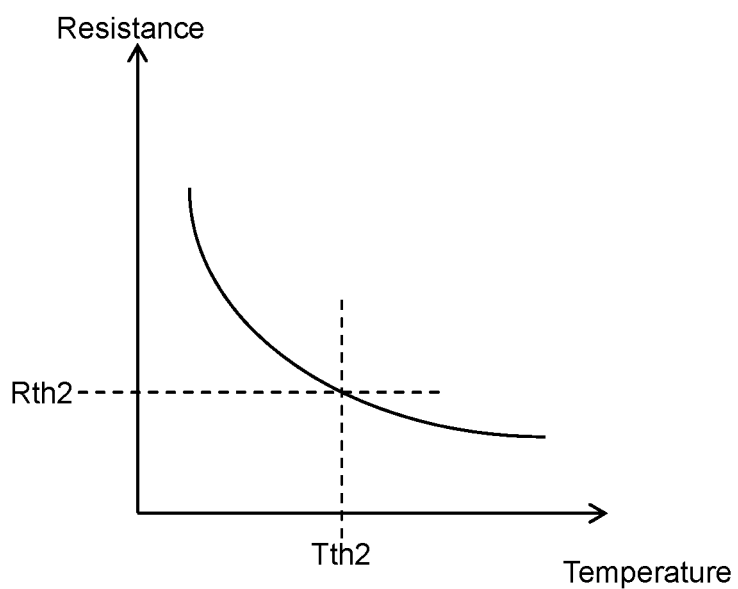
FIG. 4B illustrates resistance versus temperature relationship diagram of a temperature sensing device including a negative temperature coefficient thermistor according to an embodiment of the present invention.

In one embodiment, the temperature sensing device Rt is a thermistor having a positive temperature coefficient or a negative temperature coefficient. Please refer to FIG. 4A and FIG. 4B. FIG. 4A illustrates resistance versus temperature relationship diagram of a temperature sensing device including a negative temperature coefficient thermistor according to an embodiment of the present invention. FIG. 4B illustrates resistance versus temperature relationship diagram of a temperature sensing device including a negative temperature coefficient thermistor according to an embodiment of the present invention. Please refer to FIG. 2 and FIG. 4A. In one embodiment, in a case where the temperature sensing device Rt is a thermistor having a positive temperature coefficient, as shown in FIG. 4A, the resistance of the thermistor increases as the temperature increases. In this case, the predetermined temperature threshold Tth1 corresponds to the resistance Rth1. In this embodiment, the resistance Rth1 corresponds to the temperature sensing threshold Vref. When the temperature sensing signal Sts exceeds the temperature sensing threshold Vref, the temperature sensing circuit 30 generates an over temperature protection signal OTP indicating that the temperature to be sensed is higher than the predetermined temperature threshold Tth1. In this case, the pulse width control circuit 40 will turn OFF the transistor Q1 according to the over temperature protection signal OTP, executing over temperature protection.

Please refer to FIG. 2 and FIG. 4B. In one embodiment, in a case where the temperature sensing device Rt is a thermistor having a negative temperature coefficient, as shown in FIG. 4B, the resistance of the thermistor decreases as the temperature increases. In this case, a predetermined temperature threshold Tth2 corresponds to the resistance Rth2. In this embodiment, the resistance Rth2 corresponds to the temperature sensing threshold Vref. When the temperature sensing signal Sts exceeds the temperature sensing threshold Vref, the temperature sensing circuit 30 generates an over temperature protection signal OTP indicating that the temperature to be sensed is higher than the predetermined temperature threshold Tth2. In this case, the pulse width control circuit 40 will turn OFF the transistor Q1 according to the over temperature protection signal OTP, executing over temperature protection.

Figure 5A:
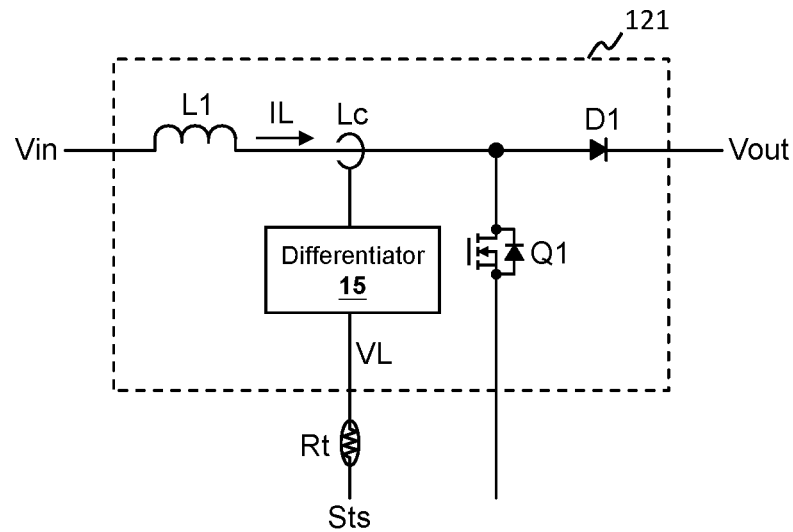
FIG. 5A shows a schematic diagram of a boost power stage circuit according to an embodiment of the present invention.
Figure 5B:
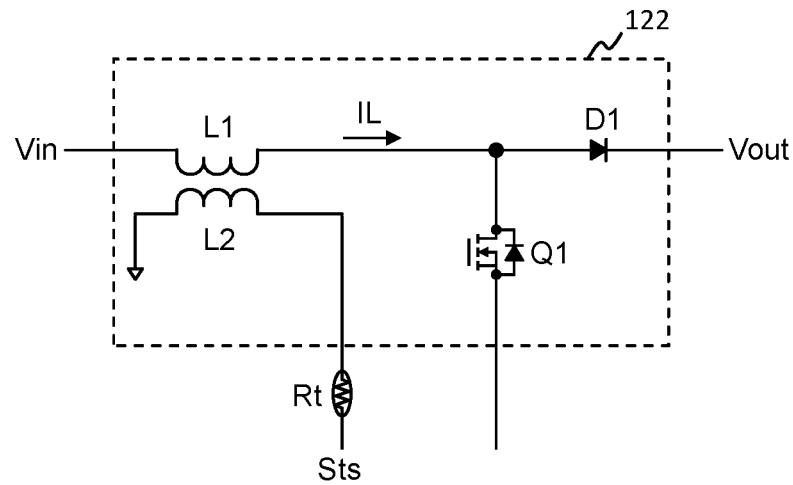
FIG. 5B shows a schematic diagram of a boost power stage circuit according to another embodiment of the present invention.

Please refer to FIG. 5A and FIG. 5B. FIG. 5A shows a schematic diagram of a boost power stage circuit according to an embodiment of the present invention. FIG. 5B shows a schematic diagram of a boost power stage circuit according to another embodiment of the present invention. The boost power stage circuit 121 of this embodiment shown in FIG. 5A is similar to the boost power stage circuit 120 of the embodiment shown in FIG. 2. In one specific embodiment, the boost power stage circuit 121 further includes: a coil Lc and a differentiator 15. The coil Lc detects a current IL flowing through a first inductor L1. The differentiator 15 executes differentiation operation on the current IL to generate a voltage VL across the first inductor L1, and a temperature sensing device Rt generates a temperature sensing signal Sts according to the voltage VL. The boost power stage circuit 122 of the embodiment shown in FIG. 5B is similar to the boost power stage circuit 120 of the embodiment shown in FIG. 2. In one specific embodiment, the boost power factor correction circuit 122 further comprises: a second inductor L2 coupled to the first inductor L1 in an electromagnetic induction fashion. In this embodiment, the temperature sensing signal Sts is related to a difference between the input voltage Vin and the output voltage Vout.

Figure 6:
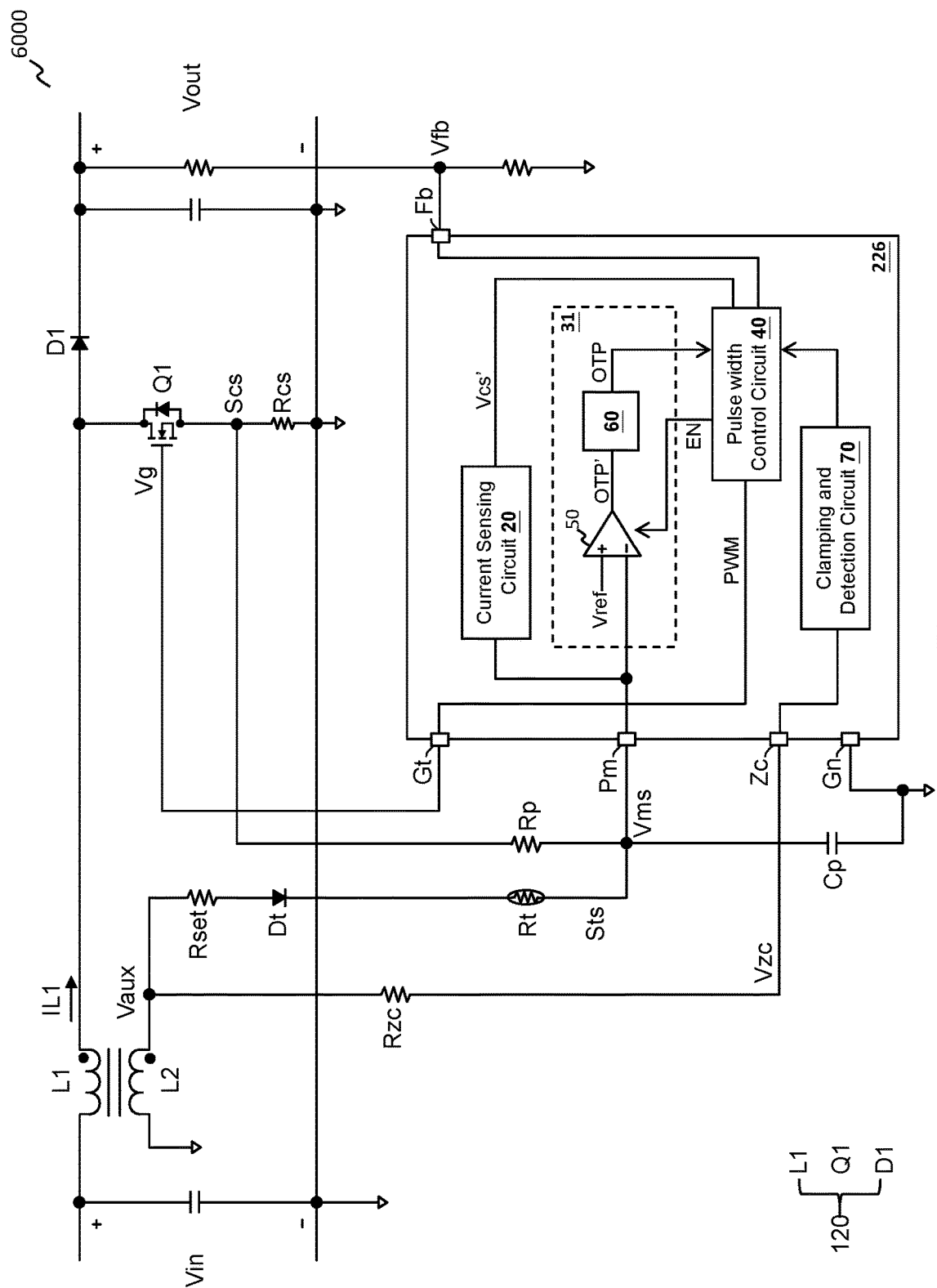
FIG. 6 shows a schematic diagram of a boost power factor correction circuit according to an embodiment of the present invention.

Please refer to FIG. 6, which shows a schematic diagram of a boost power factor correction circuit according to an embodiment of the present invention. The boost power factor correction circuit 6000 of this embodiment shown in FIG. 6 is similar to the boost power factor correction circuit 2000 of the embodiment shown in FIG. 2. In one embodiment, the boost power factor correction circuit 6000 of this embodiment further includes: a second inductor L2, a unidirectional conduction device, a voltage divider resistor Rset, a filter resistor Rp, a filter capacitor Cp and a zero current detection resistor Rzc, wherein the unidirectional conduction device can be for example a diode or a synchronous rectification switch. In this embodiment, the unidirectional conduction device is implemented as a diode Dt, which serves to ensure that the voltage at the shared pin Pm is not smaller than zero. In one embodiment, the conversion control circuit 226 further includes: a clamping and detection circuit 70 and a zero current detection pin Zc. In one embodiment, the temperature sensing circuit 31 includes: a comparison circuit 50 and a debouncing circuit or counter 60. The comparison circuit 50 is configured to compare the temperature sensing signal Sts with the temperature sensing threshold Vref, and generate an initial over temperature protection signal OTP' accordingly. The debouncing circuit or counter 60 is configured to generate the over temperature protection signal OTP according to the initial over temperature protection signal OTP', so as to reduce a noise (e.g., a ringing noise resulting from the switching operation of the boost power stage circuit 120) of the temperature sensing signal Sts.

In one embodiment, as shown in FIG. 6, the second inductor L2 is coupled to the first inductor L1 in an electromagnetic induction fashion, to generate an auxiliary voltage Vaux. In this embodiment, the second inductor L2 and the first inductor L1 constitute a transformer, wherein the first inductor L1 corresponds to a first winding of the transformer, whereas, the second inductor L2 corresponds to a second winding of the transformer. The turn ratio of the second inductor L2 to the first inductor L1 is 1:n. In one embodiment, a first end of the second inductor L2 is coupled to the temperature sensing device Rt, wherein a diode Dt is coupled between the second inductor L2 and the temperature sensing device Rt, so that the voltage at the shared pin Pm is not smaller than zero, that is, the voltage of the multipurpose sensing signal Vms is not smaller than zero. In one embodiment, the voltage divider resistor Rset is coupled between the diode Dt and the second inductor L2, or the voltage divider resistor Rset is coupled between the diode Dt and the temperature sensing device Rt, wherein the voltage divider resistor Rset is configured to divide the auxiliary voltage Vaux or to restrict a current flowing through the second inductor L2. In one embodiment, the filter resistor Rp is coupled between the current sensing signal Scs and the multipurpose sensing signal Vms, whereas the filter capacitor Cp is coupled between the multipurpose sensing signal Vms and ground potential. In one embodiment, the pulse width control circuit 40 is further configured to operably generate an enable signal EN correlated with the pulse width modulation signal PWM. In one embodiment, the zero current detection resistor Rzc is coupled between a zero current detection pin Zc and the first end of the second inductor L2. The first end of the second inductor L2 is coupled to the zero current detection pin Zc via the zero current detection resistor Rzc, so that the zero current detection pin Zc generates the zero current detection voltage Vzc. The clamping and detection circuit 70 is configured to operably clamp the zero current detection voltage Vzc via the zero current detection pin Zc, so that the zero current detection voltage Vzc is not lower than a predetermined negative voltage and is not higher than a predetermined positive voltage, and the clamping and detection circuit 70 is configured to operably detect the zero current detection voltage Vzc, so as to determine a zero current time point at which the current IL flowing through the first inductor L1 reaches zero.

Please refer to FIG. 3 along with FIG. 6. In one embodiment, during a magnetization period (energy storage period) of the second inductor L2 (i.e., as shown by the period ranging from the time point t0 to the time point t1 in FIG.

3), the current sensing circuit 20 is configured to operably sense the multipurpose sensing signal Vms via the shared pin Pm; in this case, the multipurpose sensing signal Vms is related to the current sensing signal Scs. To elaborate in more detail, within the period ranging from the time point t0 to the time point t1, the pulse width modulation signal PWM generated by the pulse width control circuit 40 controls the gate voltage Vg of the transistor Q1 via the pin Gt so that the gate voltage Vg is at high level, to turn ON the transistor Q1. The filter resistor Rp is configured to operably filter the current sensing signal Scs, to generate the multipurpose sensing signal Vms, such that the multipurpose sensing signal Vms corresponds to a filtered current sensing signal Scs within the period ranging from the time point t0 to the time point t1. It is worthwhile mentioning that, in the embodiment shown in FIG. 6, within the period ranging from the time point t0 to the time point t1, the auxiliary voltage Vaux is: −n*Vin.

In one embodiment, during a demagnetization period (energy release period) of the second inductor L2 (i.e., a period before the current flowing through the second inductor L2 is reduced to zero, as shown by the period ranging from the time point t2 to the time point t3 in FIG. 3), the temperature sensing circuit 31 is configured to operably sense the temperature sensing signal Sts via the shared pin Pm. To elaborate in more detail, within the period ranging from the time point t2 to the time point t3, the pulse width modulation signal PWM generated by the pulse width control circuit 40 controls the gate voltage Vg of the transistor Q1 via the pin Gt so that the gate voltage Vg is at low level, to turn OFF the transistor Q1. Besides, the enable signal EN generated by the pulse width control circuit 40 indicates that the transistor Q1 is OFF, and accordingly, the comparison circuit 50 compares the temperature sensing signal Sts with the temperature sensing threshold Vref, so as to determine whether the temperature to be sensed is higher than a predetermined temperature threshold. Note that in the period ranging from the time point t2 to the time point t3 in FIG. 3, the multipurpose sensing signal Vms corresponds to the temperature sensing signal Sts. For example, in one embodiment, in a case where the temperature sensing device Rt is a thermistor having a positive temperature coefficient, within the period ranging from the time point t2 to the time point t3, when a temperature to be sensed is T1 (as shown by the waveform Vms (T1) in FIG. 3), the voltage of the multipurpose sensing signal Vms corresponding to the temperature sensing signal Sts is lower than the temperature sensing threshold Vref. Consequently, under such circumstance, the comparison circuit 50 determines that the temperature to be sensed (T1) is not higher than the predetermined temperature threshold. On the other hand, within the period ranging from the time point t2 to the time point t3, when a temperature to be sensed is T2 (as shown by the waveform Vms (T2) in FIG. 3), the voltage of the multipurpose sensing signal Vms corresponding to the temperature sensing signal Sts is higher than the temperature sensing threshold Vref. Consequently, under such circumstance, the comparison circuit generates an initial over temperature protection signal OTP' indicating the temperature to be sensed (T2) is higher than the predetermined temperature threshold. Accordingly, the debouncing circuit or counter 60 generates an over temperature protection signal OTP based upon the initial over temperature protection signal OTP'. In this case, the pulse width control circuit 40 will turn OFF the transistor Q1 according to the over temperature protection signal OTP, thus executing over temperature protection.

In the embodiment of FIG. 6, within the period ranging from the time point t2 to the time point t3, the auxiliary voltage Vaux is: n*(Vout−Vin). The voltage divider resistor Rset, the temperature sensing device Rt, the filter resistor Rp and the current sensing device Rcs together serve to divide the auxiliary voltage Vaux, to generate the multipurpose sensing signal Vms, wherein the multipurpose sensing signal Vms can be represented by Formula 1 below:

$$Vms=[(Vout-Vin)*n-VDt]*(Rcs+Rp)/(Rset+Rt+Rcs+Rp) \quad \text{(Formula 1)}$$

In the Formula 1, Vms denotes a voltage of the multipurpose sensing signal Vms, which corresponds to a voltage of the temperature sensing signal Sts; n denotes a turn ratio of the second inductor L2 to the first inductor L1; VDt denotes a voltage of the diode Dt; Rset, Rt, Rp and Rcs denote resistances corresponding to the voltage divider resistor Rset, the temperature sensing device Rt, the filter resistor Rp and the current sensing device Rcs, respectively. In this embodiment, the voltage divider resistor Rset is a resistor having a relatively lower temperature coefficient, whereas, the temperature sensing device Rt is a thermistor having a relatively higher temperature coefficient. According to the Formula 1, the voltage of the temperature sensing signal Sts is proportional to a divided voltage of the difference between the input voltage Vin and the output voltage Vout, and is also proportional to the turn ratio n of the second inductor L2 to the first inductor L1. And, the voltage of the temperature sensing signal Sts is inversely proportional to the resistance of the thermistor. The aforementioned divided voltage is related to the resistance of the thermistor and the resistance of the current sensing resistor.

Figure 7:
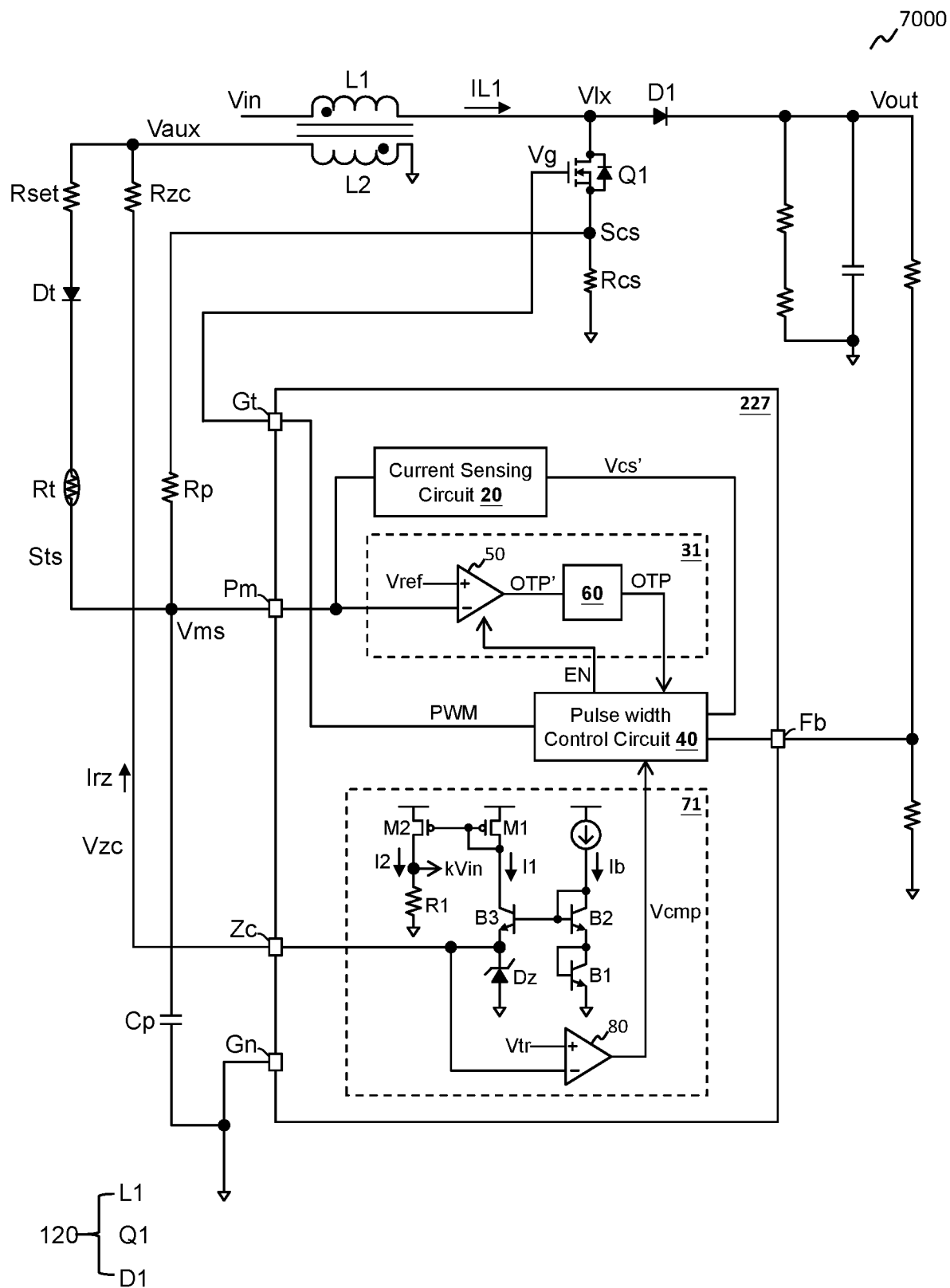
FIG. 7 shows a schematic diagram of a boost power factor correction circuit according to a specific embodiment of the present invention.

Please refer to FIG. 7, which shows a schematic diagram of a boost power factor correction circuit according to a specific embodiment of the present invention. The boost power factor correction circuit 7000 of this embodiment shown in FIG. 7 is similar to the boost power factor correction circuit 6000 of the embodiment shown in FIG. 6. In one embodiment, the boost power factor correction circuit 7000 includes a conversion control circuit 227, wherein a clamping and detection circuit 71 of the conversion control circuit 227 includes: a comparator 80, a transistor B1, a transistor B2, a transistor B3, a transistor M1, a transistor M2, a resistor R1 and a diode Dz. In one embodiment, the transistor B1, the transistor B2 and the transistor B3 are bipolar junction transistors (BJTs) having a same conductivity type, wherein the transistor B1 and the transistor B2 are diode-coupled type BJTs; the transistor M1 and the transistor M2 are Metal-Oxide-Semiconductor (MOS) transistors having a same conductivity type. In one embodiment, the diode Dz is a Zener diode, wherein the diode Dz is configured to operably clamp a zero current detection voltage Vzc at a zero current detection pin Zc, so that the zero current detection voltage Vzc at the zero current detection pin zc is not lower than a predetermined negative voltage and is not higher than a predetermined positive voltage. In this embodiment, the predetermined negative voltage is an opposite number of the forward bias voltage of the Zener diode, whereas, the predetermined positive voltage is an opposite number of the reverse bias voltage of the Zener diode.

Please refer to FIG. 3 along with FIG. 7. In one embodiment, the transistor B1, the transistor B2, the transistor B3 and the diode Dz serve to mirror a current Ib generated by a current source, to generate a current I1. The transistor M1 and the transistor M2 serve to mirror the current I1, to generate a current I2. A resistor R1 generates a signal kVin which is correlated with an input voltage Vin. A current Irz is generated according to the current I2. Referring to the period from the time point t0 to the time point t1 in FIG. 3, because the auxiliary voltage Vaux is correlated with the input voltage Vin and because the current Irz is correlated with the auxiliary voltage Vaux, the current Irz is correlated with the input voltage Vin, whereby the signal kVin is also correlated with the input voltage Vin.

Please still refer to FIG. 3 along with FIG. 7. In one embodiment, the comparator 80 is configured to receive a zero current detection voltage Vzc and compare the zero current detection voltage Vzc with a voltage threshold Vtr, to generate a comparison voltage Vcmp, thus determining a zero current time point at which the current IL1 flowing through the first inductor L1 reaches zero (in a steady state, the valley of the waveform of the current IL1 flowing through the first inductor L1 is zero). To elaborate in more detail, as shown in FIG. 3, in the instant when the zero current detection voltage Vzc drops lower than the voltage threshold Vtr, the comparison voltage Vcmp indicates that a knee point of the zero current detection voltage Vzc is being detected, so as to determine the zero current time point at which the current IL1 flowing through the first inductor L1 reaches zero (i.e., the time point t3), whereby the pulse width control circuit 40 controls the comparison circuit 50 to be disabled according to the comparison voltage Vcmp. In one embodiment, the comparison voltage Vcmp also can serve to determine the time point t2. In one embodiment, the pulse width control circuit 40 controls the boost power stage circuit 120 to operate in a Discontinuous Conduction Mode (DCM) further according to the above-mentioned zero current time point (i.e., the time point t3). As shown in FIG. 3, when the comparison voltage Vcmp detects the knee point and indicates that the zero current time point (i.e., the time point t3) is reached, the pulse width modulation signal PWM controls the transistor Q1 to keep staying OFF, and the diode D1 also becomes OFF, until the next period begins (i.e., the time point t4). Consequently, within the period from the time point t3 to the time point t4, the auxiliary voltage Vaux, the zero current detection voltage Vzc and the multipurpose sensing signal Vms will show ringing waveforms.

Figure 8:
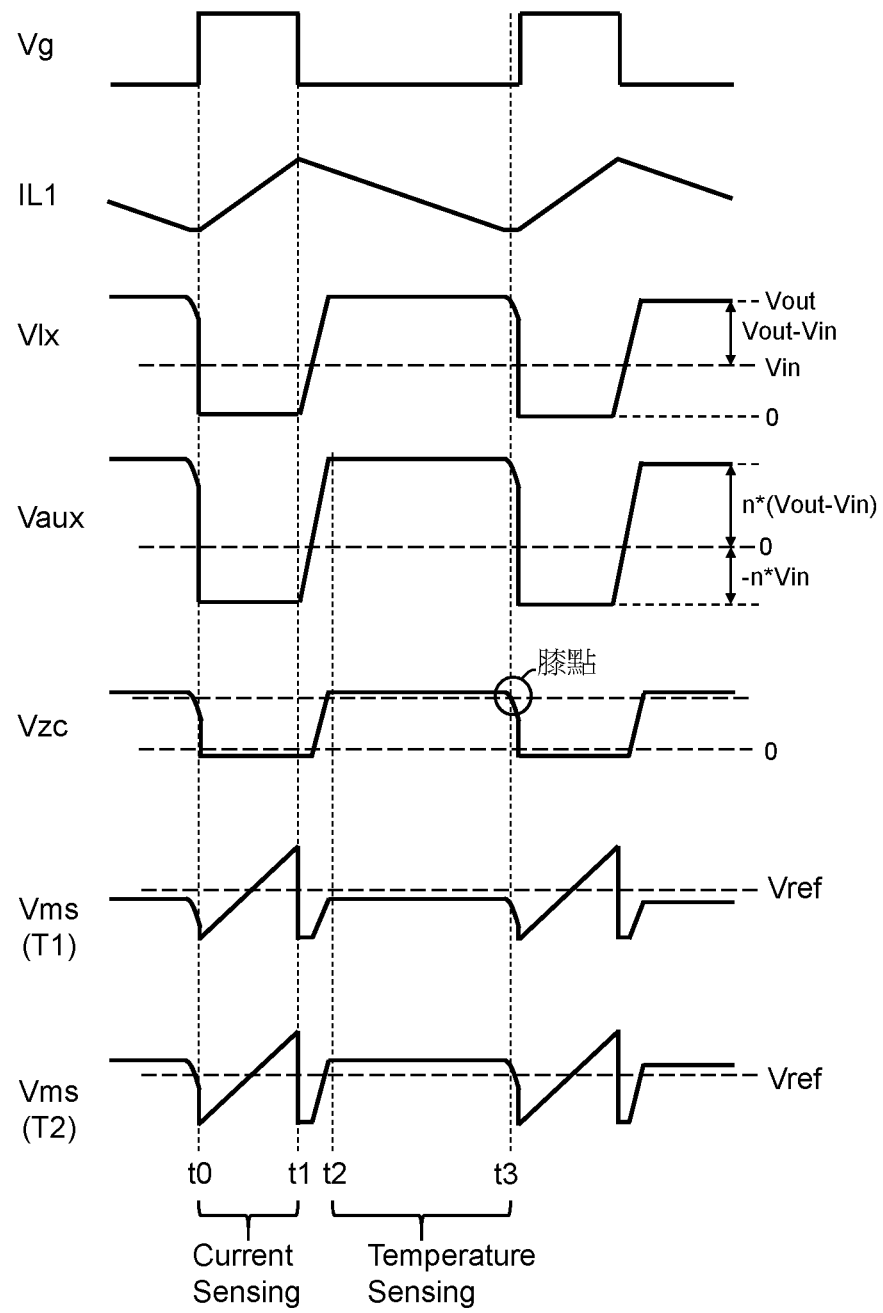
FIG. 8 illustrates a signal waveform diagram depicting the operation of a boost power factor correction circuit of FIG. 7 according to an embodiment of the present invention.

Please refer to FIG. 7 and FIG. 8. FIG. 8 illustrates a signal waveform diagram depicting the operation of a boost power factor correction circuit of FIG. 7 according to an embodiment of the present invention. In one embodiment, the pulse width control circuit 40 controls the boost power stage circuit 120 to operate in a Boundary Conduction Mode (BCM) further according to the above-mentioned zero current time point (i.e., the time point t3). As shown in FIG. 8, when the comparison voltage Vcmp detects the knee point and indicates that the zero current time point (i.e., the time point t3) is reached, the pulse width modulation signal PWM turns ON the transistor Q1, to start a new period. Note that, in the BCM, when the current IL1 flowing through the first inductor L1 reaches zero, a new period starts; this case, the auxiliary voltage Vaux, the zero current detection voltage Vzc and the multipurpose sensing signal Vms will not present ringing waveforms. In addition, please note that the voltage Vlx at the first end of the first inductor L1 is correlated with the input voltage Vin within the period from the time point t0 to the time point t1, whereas, the voltage Vlx at the first end of the first inductor L1 is correlated with a difference between the output voltage Vout and the input voltage Vin within the period from the time point t2 to the time point t3.

Figure 9:
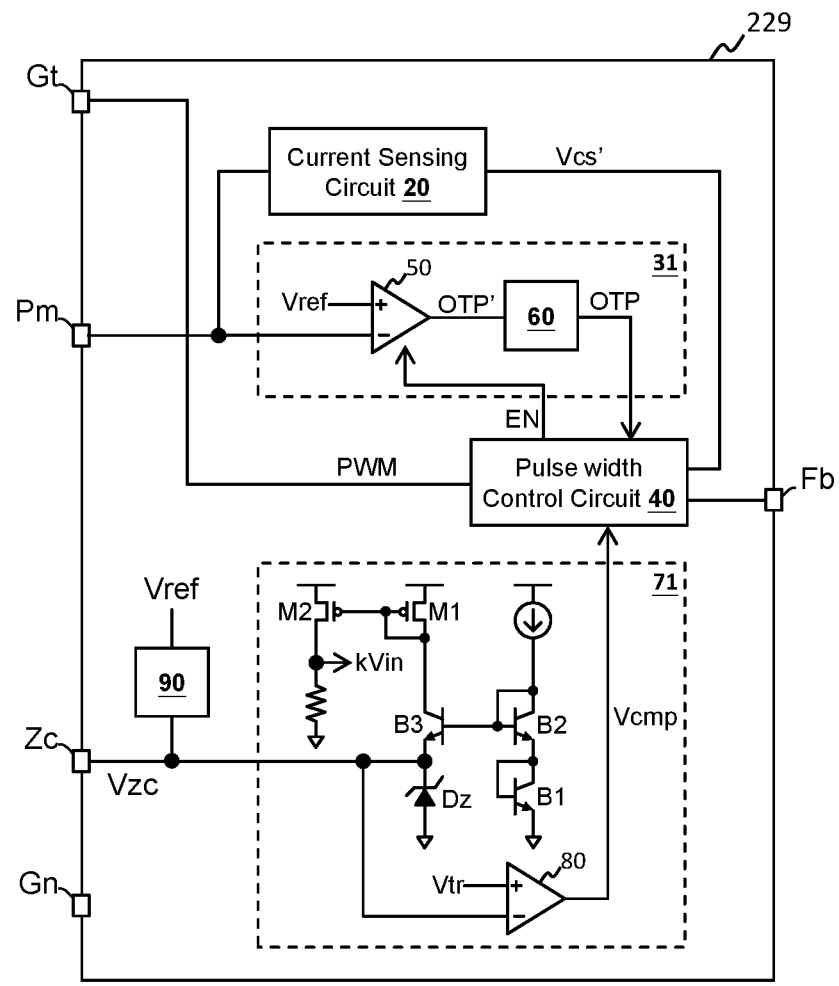
FIG. 9 shows a schematic diagram of a conversion control circuit in a boost power factor correction circuit according to a specific embodiment of the present invention.

Please refer to FIG. 9, which shows a schematic diagram of a conversion control circuit in a boost power factor correction circuit according to a specific embodiment of the present invention. The conversion control circuit 229 of this embodiment shown in FIG. 9 is similar to the conversion control circuit 227 of the embodiment shown in FIG. 7. In one embodiment, the conversion control circuit 229 further includes a signal generation circuit 90, which is configured to operably generate a temperature sensing threshold Vref according to the zero current detection voltage Vzc.

In light of above, because the boost power factor correction circuit of the present invention has a shared pin, the current sensing circuit can sense a current through the shared pin when the first switch is ON, whereas, the temperature sensing circuit can sense a temperature through the shared pin when the first switch is OFF. As a result, the present invention can achieve over temperature protection (OTP) of the boost power factor correction circuit by a reduced circuitry area of the integrated circuit and a lower manufacturing cost, and furthermore the present invention can enhance the efficiency of the boost power factor correction circuit.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A boost power factor correction circuit, which is configured to operably convert an input voltage to an output voltage with corrected power factor; the boost power factor correction circuit comprising:
   a boost power stage circuit including a first switch and a first inductor which are coupled to each other;
   a current sensing device coupled to the first switch, wherein the current sensing device is configured to operably generate a current sensing signal according to a current flowing through the first switch;
   a temperature sensing device coupled to the first inductor in non-contact fashion, wherein the temperature sensing device is configured to operably generate a temperature sensing signal; and
   a conversion control circuit, which is configured to operate the first switch, so as to control the first inductor to switch between the output voltage and a ground potential according to a duty ratio, thereby converting the input voltage to the output voltage, wherein the conversion control circuit is an integrated circuit; the conversion control circuit including:
  a shared pin coupled to the temperature sensing device and the current sensing device;
  a current sensing circuit, which is configured to operably sense a multipurpose sensing signal via the shared pin when the first switch is ON, wherein in a period when the first switch is ON, the multipurpose sensing signal is related to the current sensing signal, wherein the conversion control circuit is configured to operably control the duty ratio according to the current sensing signal; and
  a temperature sensing circuit, which is configured to operably sense the multipurpose sensing signal via the shared pin when the first switch is OFF, wherein in a period when the first switch is OFF, the multipurpose sensing signal corresponds to the temperature sensing signal, wherein when the temperature sensing signal exceeds a temperature sensing threshold, it indicates that a temperature to be sensed is higher than a predetermined temperature threshold;
  wherein the temperature sensing signal is related to the input voltage, the output voltage and an electrical parameter of the temperature sensing device which changes as the temperature to be sensed changes.

2. The boost power factor correction circuit of claim 1, further comprising:
  a second inductor coupled to the first inductor in an electromagnetic induction fashion, wherein a first end of the second inductor is coupled to the temperature sensing device, wherein the temperature sensing signal is related to a difference between the input voltage and the output voltage.

3. The boost power factor correction circuit of claim 2, wherein the second inductor and the first inductor constitute a transformer, wherein the first inductor corresponds to a first winding of the transformer, whereas, the second inductor corresponds to a second winding of the transformer.

4. The boost power factor correction circuit of claim 2, wherein the temperature sensing circuit is configured to operably sense the temperature sensing signal via the shared pin during a demagnetization period of the second inductor.

5. The boost power factor correction circuit of claim 2, further comprising:
  a unidirectional conduction device coupled between the second inductor and the temperature sensing device, so that a voltage at the shared pin is not smaller than zero.

6. The boost power factor correction circuit of claim 5, further comprising:
  a voltage divider resistor coupled to the unidirectional conduction device; and
  a filter resistor coupled between the current sensing signal and the multipurpose sensing signal, wherein the filter resistor is configured to operably filter the current sensing signal to generate the multipurpose sensing signal;
  wherein the second inductor generates an auxiliary voltage in an electromagnetic induction fashion, wherein when the first switch is OFF, the voltage divider resistor, the temperature sensing device, the filter resistor and the current sensing device are configured to operably divide the auxiliary voltage to generate the multipurpose sensing signal, wherein the multipurpose sensing signal is related to the temperature sensing signal.

7. The boost power factor correction circuit of claim 2, wherein the temperature sensing device is a thermistor having a positive temperature coefficient or a negative temperature coefficient, wherein the temperature sensing signal is proportional to a difference between the input voltage and the output voltage, and wherein the temperature sensing signal is inversely proportional to a resistance of the thermistor.

8. The boost power factor correction circuit of claim 7, wherein the current sensing device is a current sensing resistor, which is connected in series to the first switch, wherein the temperature sensing signal is further proportional to a turn ratio of the second inductor to the first inductor, and wherein the temperature sensing signal is further proportional to a divided voltage of the difference between the input voltage and the output voltage, wherein the divided voltage is related to the resistance of the thermistor and a resistance of the current sensing resistor.

9. The boost power factor correction circuit of claim 2, further comprising a zero current detection resistor, wherein the conversion control circuit further includes:
  a zero current detection pin, wherein the zero current detection resistor is coupled between the zero current detection pin and the first end of the second inductor, wherein the first end of the second inductor is coupled to the temperature sensing device; and
  a clamping and detection circuit, which is configured to operably clamp a zero current detection voltage at the zero current detection pin via the zero current detection pin, so that the zero current detection voltage at the zero current detection pin is not lower than a predetermined negative voltage, and the clamping and detection circuit is configured to operably detect the zero current detection voltage, to determine a zero current time point at which a current flowing through the first inductor reaches zero.

10. The boost power factor correction circuit of claim 9, wherein the conversion control circuit controls the boost power stage circuit to operate in a boundary conduction mode (BCM) or in a discontinuous conduction mode (DCM) further according to the zero current time point.

11. The boost power factor correction circuit of claim 9, wherein the first end of the second inductor is coupled to the zero current detection pin via the zero current detection resistor, so that the zero current detection pin generates the zero current detection voltage.

12. The boost power factor correction circuit of claim 9, wherein the clamping and detection circuit generates the temperature sensing threshold further according to the zero current detection voltage.

13. The boost power factor correction circuit of claim 1, wherein the conversion control circuit further includes:
  a pulse width control circuit, which is configured to operably generate a pulse width modulation (PWM) signal and decide the duty ratio according to the output voltage and a current related signal which is related to the current sensing signal, wherein the PWM signal is configured to operably control the first switch to switch according to the duty ratio, wherein the pulse width control circuit is further configured to operably generate an enable signal which is related to the PWM signal;
  wherein the temperature sensing circuit includes:
    a comparison circuit coupled to the shared pin, wherein the comparison circuit is configured to operably compare the temperature sensing signal with the temperature sensing threshold when the enable signal indicates the first switch is OFF, so as to determine whether the temperature to be sensed is higher than the predetermined temperature threshold.

14. The boost power factor correction circuit of claim 1, wherein the conversion control circuit further includes:
a debouncing circuit or a counter, which is configured to operably reduce a noise of the temperature sensing signal.

15. A conversion control circuit for use in a boost power factor correction circuit, wherein the boost power factor correction circuit is configured to operably convert an input voltage to an output voltage with corrected power factor, and wherein the boost power factor correction circuit includes: a boost power stage circuit including a first switch and a first inductor which are coupled to each other; a current sensing device coupled to the first switch, wherein the current sensing device is configured to operably generate a current sensing signal according to a current flowing through the first switch; and a temperature sensing device coupled to the first inductor in non-contact fashion, wherein the temperature sensing device is configured to operably generate a temperature sensing signal; wherein the conversion control circuit is configured to operate the first switch, so as to control the first inductor to switch between the output voltage and a ground potential according to a duty ratio, thereby converting the input voltage to the output voltage, wherein the conversion control circuit is an integrated circuit; the conversion control circuit comprising:
a shared pin coupled to the temperature sensing device and the current sensing device;
a current sensing circuit, which is configured to operably sense a multipurpose sensing signal via the shared pin when the first switch is ON, wherein in a period when the first switch is ON, the multipurpose sensing signal is related to the current sensing signal, wherein the conversion control circuit is configured to operably control the duty ratio according to the current sensing signal; and
a temperature sensing circuit, which is configured to operably sense the multipurpose sensing signal via the shared pin when the first switch is OFF, wherein in a period when the first switch is OFF, the multipurpose sensing signal corresponds to the temperature sensing signal, wherein when the temperature sensing signal exceeds a temperature sensing threshold, it indicates that a temperature to be sensed is higher than a predetermined temperature threshold;
wherein the temperature sensing signal is related to the input voltage, the output voltage and an electrical parameter of the temperature sensing device which changes as the temperature to be sensed changes.

16. The conversion control circuit of claim 15, wherein the boost power factor correction circuit further includes:
a second inductor coupled to the first inductor in an electromagnetic induction fashion, wherein a first end of the second inductor is coupled to the temperature sensing device, wherein the temperature sensing signal is related to a difference between the input voltage and the output voltage.

17. The conversion control circuit of claim 16, wherein the second inductor and the first inductor constitute a transformer, wherein the first inductor corresponds to a first winding of the transformer, whereas, the second inductor corresponds to a second winding of the transformer.

18. The conversion control circuit of claim 16, wherein the temperature sensing circuit is configured to operably sense the temperature sensing signal via the shared pin during a demagnetization period of the second inductor.

19. The conversion control circuit of claim 16, wherein the boost power factor correction circuit further includes:
a unidirectional conduction device coupled between the second inductor and the temperature sensing device, so that a voltage at the shared pin is not smaller than zero.

20. The conversion control circuit of claim 19, wherein the boost power factor correction circuit further includes:
a voltage divider resistor coupled to the unidirectional conduction device; and
a filter resistor coupled between the current sensing signal and the multipurpose sensing signal, wherein the filter resistor is configured to operably filter the current sensing signal to generate the multipurpose sensing signal;
wherein the second inductor generates an auxiliary voltage in an electromagnetic induction fashion, wherein when the first switch is OFF, the voltage divider resistor, the temperature sensing device, the filter resistor and the current sensing device are configured to operably divide the auxiliary voltage to generate the multipurpose sensing signal, wherein the multipurpose sensing signal is related to the temperature sensing signal.

21. The conversion control circuit of claim 16, wherein the temperature sensing device is a thermistor having a positive temperature coefficient or a negative temperature coefficient, wherein the temperature sensing signal is proportional to a difference between the input voltage and the output voltage, and wherein the temperature sensing signal is inversely proportional to a resistance of the thermistor.

22. The conversion control circuit of claim 21, wherein the current sensing device is a current sensing resistor, which is connected in series to the first switch, wherein the temperature sensing signal is further proportional to a turn ratio of the second inductor to the first inductor, and wherein the sensing temperature signal is further proportional to a divided voltage of the difference between the input voltage and the output voltage, wherein the divided voltage is related to the resistance of the thermistor and a resistance of the current sensing resistor.

23. The conversion control circuit of claim 16, wherein the boost power factor correction circuit further includes: a zero current detection resistor, wherein the conversion control circuit further comprising:
a zero current detection pin, wherein the zero current detection resistor is coupled between the zero current detection pin and the first end of the second inductor, wherein the first end of the second inductor is coupled to the temperature sensing device; and
a clamping and detection circuit, which is configured to operably clamp a zero current detection voltage at the zero current detection pin via the zero current detection pin, so that the zero current detection voltage at the zero current detection pin is not lower than a predetermined negative voltage, and the clamping and detection circuit is configured to operably detect the zero current detection voltage, to determine a zero current time point at which a current flowing through the first inductor reaches zero.

24. The conversion control circuit of claim 23, wherein the conversion control circuit controls the boost power stage circuit to operate in a boundary conduction mode (BCM) or in a discontinuous conduction mode (DCM) further according to the zero current time point.

25. The conversion control circuit of claim 23, wherein the first end of the second inductor is coupled to the zero current detection pin via the zero current detection resistor, so that the zero current detection pin generates the zero current detection voltage.

26. The conversion control circuit of claim 23, wherein the clamping and detection circuit generates the temperature sensing threshold further according to the zero current detection voltage.

27. The conversion control circuit of claim 15, further comprising:
- a pulse width control circuit, which is configured to operably generate a pulse width modulation (PWM) signal and decide the duty ratio according to the output voltage and a current related signal which is related to the current sensing signal, wherein the PWM signal is configured to operably control the first switch to switch according to the duty ratio, wherein the pulse width control circuit is further configured to operably generate an enable signal which is related to the PWM signal;

wherein the temperature sensing circuit includes:
- a comparison circuit coupled to the shared pin, wherein the comparison circuit is configured to operably compare the temperature sensing signal with the temperature sensing threshold when the enable signal indicates the first switch is OFF, so as to determine whether the temperature to be sensed is higher than the predetermined temperature threshold.

28. The conversion control circuit of claim 15, further comprising:
- a debouncing circuit or a counter, which is configured to operably reduce a noise of the temperature sensing signal.

* * * * *